United States Patent
Larson et al.

(10) Patent No.: US 11,659,292 B2
(45) Date of Patent: May 23, 2023

(54) IMAGE OUTPUT ADJUSTMENT RESPONSIVE TO INTEGRATION TIME CHANGES FOR INFRARED IMAGING DEVICES

(71) Applicant: FLIR Systems AB, Taby (SE)

(72) Inventors: Odd Larson, Taby (SE); Erland Waldreus, Taby (SE)

(73) Assignee: FLIR Systemes AB, Täby (SE)

( * ) Notice: Subject to any disclaimer, the term of this patent is extended or adjusted under 35 U.S.C. 154(b) by 305 days.

(21) Appl. No.: 16/208,428

(22) Filed: Dec. 3, 2018

(65) Prior Publication Data
US 2019/0208147 A1  Jul. 4, 2019

Related U.S. Application Data

(60) Provisional application No. 62/611,970, filed on Dec. 29, 2017.

(51) Int. Cl.
*H04N 5/33* (2023.01)
*H04N 25/533* (2023.01)
*H04N 23/73* (2023.01)

(52) U.S. Cl.
CPC .............. *H04N 25/533* (2023.01); *H04N 5/33* (2013.01); *H04N 23/73* (2023.01)

(58) Field of Classification Search
CPC ........ H04N 5/33; H04N 5/243; H04N 5/3535; H04N 5/2353
USPC ...................................................... 250/208.1
See application file for complete search history.

(56) References Cited

U.S. PATENT DOCUMENTS

| | | | |
|---|---|---|---|
| 8,373,757 B1 * | 2/2013 | Nguyen | H04N 17/002 348/164 |
| 8,780,420 B1 * | 7/2014 | Bluzer | H04N 1/04 358/486 |
| 9,648,253 B2 | 5/2017 | Johansson et al. | |
| 2010/0271503 A1 * | 10/2010 | Safaee-Rad | H04N 9/735 348/223.1 |
| 2014/0085507 A1 * | 3/2014 | Pillman | H04N 5/23222 348/231.99 |
| 2014/0139643 A1 * | 5/2014 | Hogasten | H04N 5/33 348/48 |
| 2017/0054905 A1 * | 2/2017 | Iwasaki | H04N 5/2355 |
| 2017/0126993 A1 * | 5/2017 | Madurawe | H04N 5/378 |

FOREIGN PATENT DOCUMENTS

| WO | WO 2013/055273 | 4/2013 |
|---|---|---|
| WO | WO 2013/055274 | 4/2013 |

* cited by examiner

*Primary Examiner* — Tony Ko
(74) *Attorney, Agent, or Firm* — Haynes and Boone, LLP

(57) ABSTRACT

Techniques are disclosed for image output responsive to integration time changes for infrared imaging devices. In one example, a system includes an imaging device configured to capture a first image using a first integration time and a second image using a second integration time different from the first integration time. The system further includes a processing circuit configured to determine the second integration time based at least on content of the first image. The processing circuit is further configured to determine a scale factor for the second integration time based on the first integration time and the second integration time. The processing circuit is further configured to scale the second image by the scale factor. Related methods and devices are also provided.

19 Claims, 3 Drawing Sheets

IMAGE OUTPUT ADJUSTMENT RESPONSIVE TO INTEGRATION TIME CHANGES FOR INFRARED IMAGING DEVICES

CROSS REFERENCE TO RELATED APPLICATIONS

This application claims the benefit of and priority to U.S. Provisional Patent Application No. 62/611,970 filed Dec. 29, 2017 and entitled "IMAGE OUTPUT ADJUSTMENT RESPONSIVE TO INTEGRATION TIME CHANGES FOR INFRARED IMAGING DEVICES," which is incorporated herein by reference in its entirety.

TECHNICAL FIELD

One or more embodiments of the invention relate generally to infrared imaging devices and more particularly, for example, to image output adjustment responsive to integration time changes for infrared imaging devices.

BACKGROUND

Integration time may refer to as an "exposure" time during which a sensor collects incoming radiation and ends when the collected data is read out as a detected signal. Different types of sensors may be sensitive to and utilized to collect different types of radiation. For example, a visible-light sensor, an infrared sensor, and a thermal sensor may be utilized to collect visible-light radiation, infrared radiation, and thermal radiation, respectively.

Conventionally, integration times for an infrared image device and their corresponding sensors are fixed. However, this does not account for varying scene temperatures, which may have different optimal integration depending on temperature and the amount of incoming radiation. Thus, integration time across changing temperatures in a scene is not optimized when using fixed integration times for sensor elements.

SUMMARY

In some embodiments, a method includes capturing, by an infrared imaging device, a first image using a first integration time. The method further includes determining a second integration time based at least on characteristics of the first image. The method further includes determining a scale factor based the first integration time and the second integration time. The method further includes capturing, by the infrared imaging device, a second image using the second integration time. The method further includes scaling the second image by the scale factor.

In some embodiments, a system includes an imaging device configured to capture a first image using a first integration time and a second image using a second integration time different from the first integration time. The system further includes a processing circuit configured to determine the second integration time based at least on content of the first image. The processing circuit is further configured to determine a scale factor for the second integration time based on the first integration time and the second integration time. The processing circuit is further configured to scale the second image by the scale factor.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Figure 1:
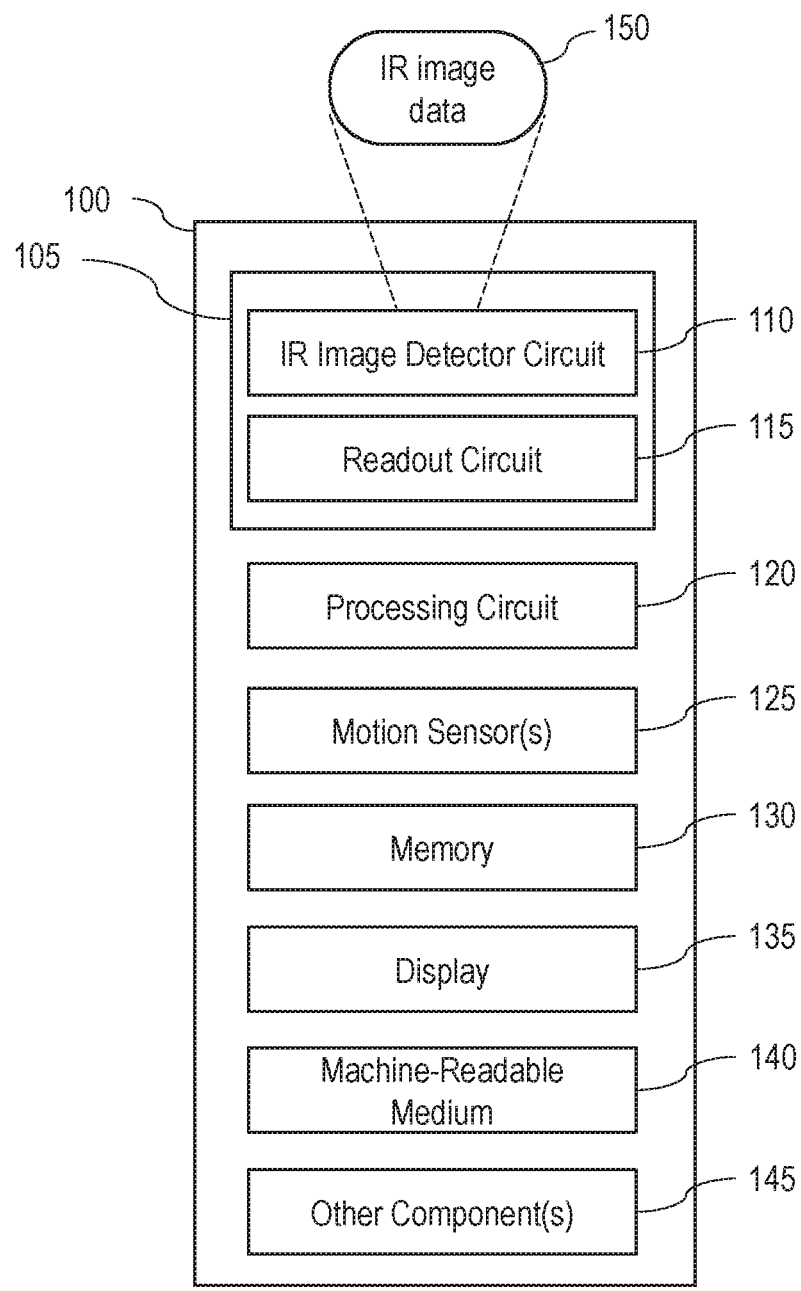
FIG. 1 illustrates a block diagram of an example infrared imaging device, according to an embodiment.

FIG. 1 illustrates a block diagram of an example infrared (IR) imaging device 100 (e.g., a thermal IR imaging device), according to an embodiment. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The IR imaging device 100 includes an IR image capture circuit 105, a processing circuit 120, a motion sensor(s) 125, memory 130, a display 135, a machine-readable medium 140, and/or other components 145. The IR image capture circuit 105 includes an IR image detector circuit 110 (e.g., a thermal IR detector circuit) and a readout circuit 115 (e.g., a readout integrated circuit (ROIC)). In some aspects, the IR image capture circuit 105 may capture (e.g., detect, sense) IR radiation with wavelengths in the range from around 700 nm to around 2 mm, or portion thereof. For example, in some aspects, the IR image capture circuit 105 may be sensitive to (e.g., better detect) mid-wave IR (MWIR) radiation (e.g., electromagnetic radiation with wavelength of 2-5 µm) and/or long-wave IR (LWIR) radiation (e.g., electromagnetic radiation with wavelength of 7-14 µm), or any desired IR wavelengths (e.g., generally in the 0.7 to 14 µm range).

The IR image capture circuit 105 may capture an IR image associated with a scene (e.g., a real world scene). To capture the IR image, the IR image detector circuit 110 may detect IR image data 150 (e.g., in the form of IR radiation) and generate pixel values of the IR image based on the IR image data 150. An IR image may be referred to as an IR frame or an IR image frame. In some cases, the IR image detector circuit 110 may include an array of IR detectors that can detect IR radiation, convert the detected IR radiation into electrical signals (e.g., voltages, currents, etc.), and generate the pixel values based on the electrical signals. Each IR detector in the array may capture a respective portion of the IR image data 150 and generate a pixel value based on the respective portion captured by the IR detector. The pixel value generated by the IR detector may be referred to as an output of the IR detector. The IR detector may be referred to as a detector, sensor, or infrared sensor.

The IR image may be, or may be considered, a data structure that includes pixels and is a representation of the IR image data 150, with each pixel having a pixel value that represents IR radiation emitted or reflected from a portion of the scene and received by an IR detector that generates the pixel value. Based on context, a pixel may refer to an IR detector of the IR image detector circuit 110 that generates an associated pixel value or a pixel (e.g., pixel location, pixel coordinate) of the IR image formed from the generated pixel values.

In an aspect, the pixel values generated by the IR image detector circuit 110 may be represented in terms of digital count values generated based on the electrical signals obtained from converting the detected IR radiation. For example, in a case that the IR image detector circuit 110 includes or is otherwise coupled to an analog-to-digital converter (ADC) circuit, the ADC circuit may generate digital count values based on the electrical signals. For an ADC circuit that can represent an electrical signal using 14 bits, the digital count value may range from 0 to 16,383. In such cases, the pixel value of the IR detector may be the digital count value output from the ADC circuit. In other cases (e.g., in cases without an ADC circuit), the pixel value may be analog in nature with a value that is, or is indicative of, the value of the electrical signal. In general, a larger amount of IR radiation being incident on and detected by the IR image detector circuit 110 is associated with higher digital count values and higher temperatures.

In various embodiments, the IR image detector circuit 110 may be, may include, or may be a part of an FPA. By way of non-limiting example, the IR image detector circuit 110 may be a microbolometer FPA or a photon detector FPA. A microbolometer FPA may be formed of an array of thermal detectors that detect IR radiation in the form of heat energy and generate pixel values based on the amount of heat energy detected. A microbolometer FPA may include IR detecting materials such as amorphous silicon (a-Si), vanadium oxide ($VO_x$), a combination thereof, and/or other detecting material(s). A microbolometer FPA usually does not require cooling. In an aspect, an IR imaging device (e.g., the IR imaging device 100) equipped with uncooled FPAs (e.g., uncooled microbolometer FPAs) may be referred to as an uncooled IR imaging device (e.g., an uncooled IR camera).

A photon detector FPA may be formed of an array of photon detectors that detect IR radiation in the form of photons and generate the pixel value based on the quantity of photons detected (e.g., energy associated with the photons collected). A photon detector FPA may include IR detecting materials such as indium gallium arsenide (InGaAs), indium antimonide (InSb), indium arsenide (InAs), germanium, a combination thereof, and/or other detecting material(s). A photon detector FPA may include a quantum well infrared photodetector (QWIP). A photon detector FPA usually requires cooling. In an aspect, an IR imaging device (e.g., the IR imaging device 100) equipped with cooled FPAs (e.g., cooled photon detector FPAs) may be referred to as a cooled IR imaging device.

The readout circuit 115 may be utilized as an interface between the IR image detector circuit 110 that detects the IR image data 150 and the processing circuit 120 that processes the detected IR image data 150 as read out by the readout circuit 115. An image capturing frame rate may refer to the rate (e.g., images per second) at which IR images are detected in a sequence by the IR image detector circuit 110 and read out to the processing circuit 120 by the readout circuit 115. The readout circuit 115 may read out the pixel values generated by the IR image detector circuit 110 in accordance with an integration time (e.g., also referred to as an integration period). Integration time for a sensor may correspond to an amount of time that incoming radiation striking the sensor is converted to electrons that are stored prior to a signal being read (e.g., in an integration capacitor that may be opened or shorted when being read to act as a type of "shutter").

Thus, for a photon detector FPA, the integration time may be, or may be indicative of, a time interval that begins at a time of collecting (e.g., trapping and retaining) IR radiation and ends at a time of reading out the collected IR radiation. In this regard, signal levels (e.g., IR radiation levels) captured by the IR image capture circuit 105 may depend on the applied integration time. For example, for a given pixel (e.g., IR detector), a longer integration time may be associated with more IR radiation being collected than a shorter integration time. In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of photons (e.g., by photon detectors) and/or heat energy (e.g., by microbolometers).

The processing circuit 120 may perform operations to process the pixel values received from the readout circuit 115. By way of non-limiting example, the processing circuit 120 may perform operations such as non-uniformity correction (NUC), spatial and/or temporal filtering, and/or radiometric conversion on the pixel values. In some cases, the processing circuit 120 may combine multiple IR images (e.g., each IR image associated with a respective set of pixel values) to generate a combined IR image. In an embodiment, the processing circuit 120 may dynamically adjust an integration time utilized by infrared sensors for IR image capture, as well as apply a scaling factor (e.g., also referred to as a global gain factor) to captured IR images to reduce or prevent image flickering that may result from dynamically adjusting an integration time. The scaling factor may be based on the integration time adjustment (e.g., based on a change from integration time $T_1$ to a different integration time $T_2$). Thus, different images may be captured by the IR image detector circuit 110 using different integration times, and these different images may each have a respective scaling factor applied to them. In some cases, alternatively or in addition, such processes may be provided on the readout circuit 115.

The processing circuit 120 may be implemented as any appropriate processing device, such as, by way of non-limiting example, a central processing unit (CPU), a graphics processing unit (GPU), a digital signal processor (DSP), a logic device, a microcontroller, an application specific integrated circuit (ASIC), a programmable logic device (PLD), a combination thereof, and/or other device. The processing circuit 120 may include combinations of hardware and software processing functionality and may be provided with or communicatively coupled to other components to execute appropriate instructions, such as software instructions and/or processing parameters (e.g., filtering coefficients, global gain factor to offset changes in integration time, NUC correction terms) stored in the memory 130 and/or the machine-readable medium 140.

The motion sensor(s) 125 may be implemented by one or more accelerometers, gyroscopes, and/or other appropriate devices that may be used to detect movement of the IR imaging device 100. The information provided by the motion sensor(s) 125 may facilitate image processing operations (e.g., spatial filtering, temporal filtering) performed by the processing circuit 120, such as by facilitating differentiation between motion in the scene relative to motion of the IR imaging device 100. In some cases, the motion sensor(s) 125 may be implemented as part of the IR imaging device 100 and/or in other device(s) attached to or otherwise interfaced with the IR imaging device 100.

The memory 130 may be utilized to store information for facilitating operation of the IR imaging device 100. The memory 130 may store information such as instructions to be executed by the various components (e.g., the processing circuit 120) of the IR imaging device 100, parameters associated with processing operations (e.g., the global gain factor that counteracts changing integration times for infrared sensors, filtering coefficients), information associated with previously generated images (e.g., for temporal filtering), and/or other information. By way of non-limiting example, the memory 130 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 130 may include volatile memory, such as random-access memory (RAM), dynamic RAM (DRAM), static RAM (SRAM), etc.

The IR imaging device 100 may include the display 135. The display 135 (e.g., screen, touchscreen, monitor) may be used to display captured and/or processed IR images and/or other images, data, and/or information (e.g., legend relating color in the images with temperatures). For example, the images (or a visual representation of the images) may be displayed as individual static images and/or as a series of images in a video sequence. The display 135 may receive the images in accordance with a display communication protocol and/or specification of the display 135 (e.g., the resolution of the display 135). The images that are displayed may be based on images captured by the IR image detector circuit 110 and a respective global gain factor applied to these images. The global gain factor that is applied may be adjusted (e.g., updated) when an integration time of infrared sensors is dynamically adjusted during infrared radiation capture from IR image data 150.

The IR imaging device 100 may include the machine-readable medium 140. The machine-readable medium 140 may be a non-transitory storage utilized to store instructions and/or processing parameters to be loaded into the memory 130 and utilized by the various components of the IR imaging device 100 (e.g., the IR image capture circuit 105, the processing circuit 120, etc.). In addition, the IR imaging device 100 may include other components 145. By way of non-limiting example, the other components 145 may be used to implement any features of the IR imaging device 100 as may be desired for various applications (e.g., clocks, temperature sensors, a visible light camera, or other components). The other components 145 may also be configured to provide additional processing of infrared image data, including adjustment of infrared imaging device temperature and capture temperature range (e.g., temperature and capture temperature of the IR image detector circuit 110), gain, resolution, and/or adjustment of the connected optics or lenses. In various embodiments, the other components 145 may also assist in or instead provide dynamic integration time adjustment and application of a global gain factor instead of readout circuit 115 and/or processing circuit 120. In various embodiments, the display 135, the machine-readable medium 140, and the other component(s) 145 may be implemented as part of the IR imaging device 100 (as shown in FIG. 1) and/or in other device(s) attached to or otherwise interfaced with the IR imaging device 100.

In one or more embodiments, the IR imaging device 100 may allow adjustment of integration time, for example, based on scene characteristics, such as scene temperature, scene content (e.g., objects in the scene), and so forth. Such dynamic adjustment of the integration time may improve the image performance within the entire dynamic range of the scene, and leads to an image with higher dynamics (e.g., a wider histogram and thus a lower image noise).

In an aspect, using a longer integration time may optimize the IR imaging device 100 for a narrower temperature range (e.g., a smaller dynamic range) and/or a lower maximum temperature, as detectors of the IR image detector circuit 110 receiving IR radiation from high irradiance/temperature areas (e.g., objects with high temperatures) will be saturated. In an aspect, using a shorter integration time may optimize the IR imaging device 100 for a broader temperature range (e.g., a larger dynamic range) and/or a higher maximum temperature. In some cases, when the integration time is too short, the irradiance for all areas of a scene may be so low that all the areas have insufficient signal-to-noise-ratio (SNR) (e.g., since the detectors receive low IR radiation). For areas with insufficient SNR, the IR image may appear noisy/grainy when displayed. Additional integration times may allow for finer tuning and/or extension of the sensitivity, dynamic range, minimum temperature, and/or maximum temperature to accommodate various scenes/applications that may be encountered by the IR imaging device 100.

Utilizing dynamic integration times, scenes of varying irradiance/temperature levels may be more accurately captured. For example, dynamically adjusting the integration time of sensors to a shorter time may have a lower minimum temperature and/or a higher maximum temperature than using a longer integration time.

However, when the integration time changes, the signal level also changes, since the integration time controls the total amount of radiation that is collected by the IR sensors (e.g., of the IR image detector circuit 110), which may cause visible disturbances in image quality and output. An increased integration time may be associated with an increased signal level, and a decreased integration time may be associated with a decreased signal level. When an image is viewed in real-time (e.g., when capturing and outputting video of an IR scene), the change in signal level may be noticeable. In a real-time video capture and/or output where the integration time may be updated multiple times per second resulting in changing signal levels of detected infrared radiation, the image may appear to be flickering (e.g., flashing, refreshing) due to the changing signal levels, adversely affecting user experience.

For example, in some cases, such as when a white hot palette is utilized for facilitating display of the IR image, when changing from lower to higher integration time, the image of the scene that is displayed to the user may become brighter (e.g., suddenly become brighter at the time of the integration time change and remain at the brighter level) due to the integration time change. In this example, when changing from higher to lower integration time, the image may become less bright. Such changes in signal levels, especially if frequent, may adversely affect user experience.

In some cases, the captured IR image may be processed based on the integration time for the infrared sensors utilized to capture the IR image. In some embodiments, to compensate for the changing signal levels and resulting flickering in un-processed thermal imaging data, a term may be introduced to the image data from the infrared sensors of IR image detector circuit 110. The term may correspond to a global offset term or factor, such as a global gain factor, introduced based on the adjustment to the integration time (e.g., to counteract or accommodate for the integration time adjustment). The term may correspond to a constant, described herein as "k," which may also depend on the adjustment to the integration time (e.g., as a ratio of two integration times, the previous integration time ($T_1$) and the new integration time ($T_2$) that the sensor integration time is changed to. For example, for each pixel, the integration time change from $T_1$ to $T_2$ may cause the signal level of the pixel to be scaled by $T_2/T_1$. In this regard, In order to compensate for signal level changes when changing the integration time, which may cause flickering due to changing signal levels (e.g., abruptly changing signal levels), a global gain factor may be applied to image data.

Thus, the global gain factor to compensate for the change in signal level from $T_2/T_1$ may correspond to $k*T_1/T_2$, which is the inverse of the change in signal level multiplied by the constant k. The received signal level may be multiplied by the global gain factor so that the image output signal data is scaled by $k*T_1/T_2$. Thus, when the integration time is adjusted dynamically, the resulting image output data with the global gain factor applied does not exhibit flickering or other artificially introduced image elements caused by adjusting the integration time (i.e., not caused by the thermal radiation data from the scene of IR image data 150). Compensation based on the constant k and the change in integration time from $T_1$ to $T_2$ may be performed at the level of the readout circuit 115, or may be performed by processing circuit 120. An example of a processing pipeline is described with respect to FIG. 3.

Figure 2:
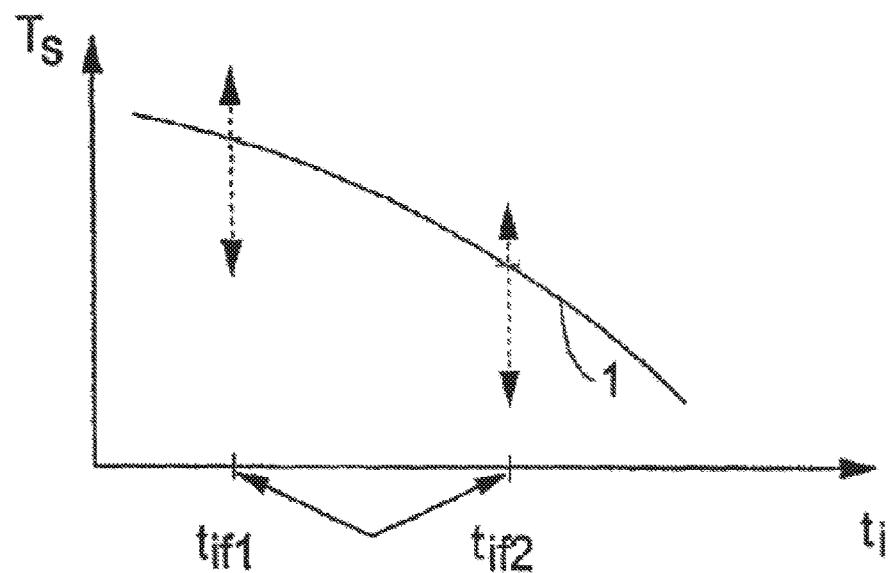
FIG. 2 illustrates integration times over varying scene temperature.

As an example of different integration times, FIG. 2 illustrates integration times over varying scene temperature. FIG. 2 shows an example of how the integration time $t_i$ for optimal image performance relates to the scene temperature $T_s$ along a curve 1, where curve 1 shows the optimal integration time $t_i$ for scene temperature $T_s$. At two fixed integration times (corresponds to the designated points $T_{if1}$ and $T_{if2}$) a gain map can be established for each of $T_{if1}$ and $T_{if2}$ in time when utilizing fixed integration times, and not dynamic adjustment of integration time. Thus, in the case of fixed integration times, the image performance is optimized only for these single scene temperature points of $T_{if1}$ and $T_{if2}$ which have a corresponding gain map for the fixed integration time.

Thus, when utilizing fixed integration times as shown in FIG. 2, use of these fixed integration times is optimal only for two specific scene temperature points within the dynamic range for thermal radiation capture. That is, details for adjustment of amplification and other image processing may only be stored for these two points. This may cause impairment of image performance of other values that may be within the dynamic range of data capture.

Conversely, in the case of a dynamic integration time in accordance with various embodiments, an integration time may be dynamically adjusted along the curve 1 in order to maintain image quality at the encompassed temperatures. In this regard, for example, the integration time may be adjusted responsive to scene temperature changes. However, since the IR imaging system (e.g., IR imaging device 100) may receive changing signal levels based on the changing integration time, the IR imaging system may utilize a global gain factor to correct for (e.g., counteract, accommodate for) image disturbances caused by adjustment of integration time.

Figure 3:
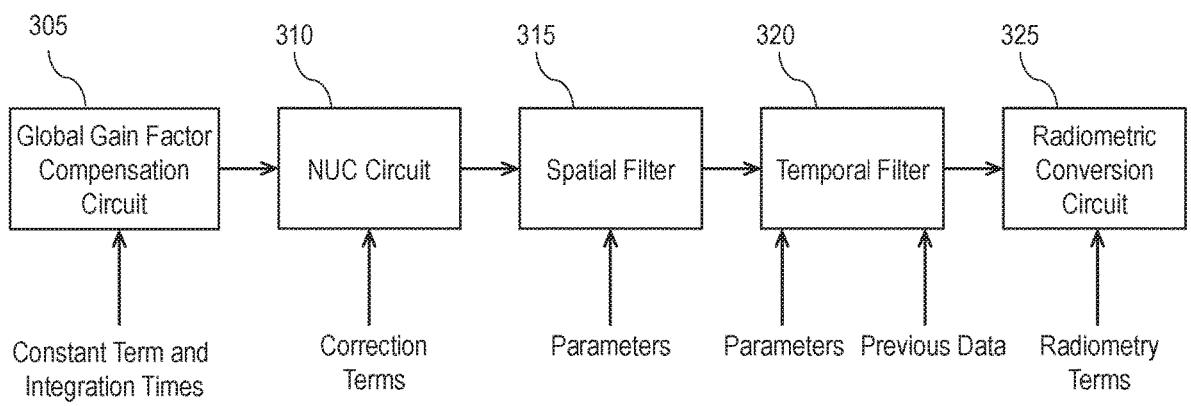
FIG. 3 illustrates an example processing pipeline, according to an embodiment.

FIG. 3 illustrates an example processing pipeline, according to an embodiment. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, IR images captured by the IR image detector circuit 110 of the IR imaging device 100 may be provided to the processing pipeline for processing.

The processing pipeline includes a global gain factor compensation circuit 305, a non-uniformity correction (NUC) circuit 310, a spatial filter 315, a temporal filter 320, and a radiometric conversion circuit 325. The possible appearance of the flow in a process with a dynamically adapted integration time is described below. The process may include image pre-processing steps (e.g., performed prior to image display) to accommodate for integration time changes between an initial integration time $T_1$ used by infrared sensors to capture a scene and an updated integration time $T_2$ that the infrared sensors are dynamically adjusted to use during capture of infrared radiation from the scene. In an aspect, this change in integration time may cause a signal level change that depends on the relation between the new integration time and the old integration time.

In some cases, the integration time may be adjusted to provide tuning and/or extension of dynamic range, sensitivity, minimum temperature, and/or maximum temperature sensitivity to accommodate various scenes/applications that can be encountered by the IR imaging device. For example, the integration time may be adjusted as appropriate to avoid saturation of pixels and/or have pixel values at least above a threshold SNR. In this regard, such integration time changes may be based on scene characteristics, such as scene temperature and scene content (e.g., objects in the scene), and/or changes in scene characteristics.

In order to accommodate for the change in integration time (e.g., to mitigate flickering due to such integration time changes), a global gain factor may be introduced (e.g., applied). In this regard, the global gain factor compensation circuit 305 may execute one or more processes to determine a global gain factor and adjust signal level data based on the global gain factor. The global gain factor compensation circuit 305 may be performed by readout circuit 115 and/or processing circuit 120. In some cases, the global gain factor compensation circuit 305 may be coupled to the readout circuit 115. The global gain factor compensation circuit 305 may be executed on the received data (e.g., signal levels) from IR image detector circuit 110, and prior to output of thermal imaging data on the display 135.

In some embodiments, the signal level change resulting from a transition from using the integration time $T_1$ to using the integration time $T_2$ may be based on the ratio $T_2/T_1$. The change in signal level can be counteracted by adjusting the signal level using a global gain factor that depends on the inverse of the signal change level relationship $T_2/T_1$. The global gain factor therefore corresponds to $k*T_1/T_2$. When the integration time is updated from $T_1$ to $T_2$, the global gain factor should therefore be updated based on the inverse relation between the new integration time and the old integration time $(T_1/T_2)$. By compensating the total IR image using this global gain factor $k*T_1/T_2$ to accommodate for the integration time change, image flicker and/or other image disturbances introduced due to the change in integration time may be mitigated. In some cases, such compensation of the total IR image may be synchronized with the integration time change. The global gain is simultaneously updated with $k*T_1/T_2$, so that the signal level in the total image is simultaneously multiplied by the same factor $k*T_1/T_2$ at the global gain factor compensation circuit 305. This compensates for the image level change of $T_2/T_1$. Thus, in such cases, at and prior to NUC operations at NUC circuit 310, gain $T_2/T_1$ associated with the integration time change from $T_1$ to $T_2$ has been counteracted at the global gain factor compensation circuit 305 through use of the global gain factor $k*T_1/T_2$.

The factor k is a scale factor which compensates for a non-direct relationship between integration time and image dynamics. The factor k is a non-linear function of the integration time. The factor k may not be unique for every readout circuit and corresponding infrared sensors, but may instead handle varying technologies and manufacturers. In an aspect, the factor k may be empirically derived from a number of samples at varying combinations of black body temperature, integration time, and ambient temperature. Measurements may be made over a range of specified temperature environmental conditions, since stray light may vary for different ambient temperatures. In some cases, the range of specified temperature environmental conditions may be tested on (e.g., applied to) multiple units (e.g., multiple IR imaging devices such as IR imaging device 100) to cover individual spread, which is generally different for each detector and ROIC model. In an aspect, the factor k may generally be a non-linear function of the integration time. In cases when a difference between $T_1$ and $T_2$ is small, the factor k may be considered to be a constant.

Thus, using various embodiments, applying of the global gain factor allows for a dynamic adaptation of the integration time as the scene content changes, and thus an improved image performance (e.g., without flickering and/or other disturbances associated with changes in the integration time). The adjustment of the signal level may restore the histogram of the image. In some cases, determining of the global gain factor is synchronized with an integration time update such that the global gain factor compensation circuit 305 can apply the appropriate global gain factor to the IR image captured using the updated integration time. Thus, for example, in real time applications (e.g., real time video applications), the global gain factor compensation circuit 305 is applied in real-time as the thermal data is read from the signal levels of a IR scene and prior to output of image/video thermal data, such that flickering and/or other disturbances associated with changes in the integration time are reduced or eliminated.

The NUC circuit 310 may be coupled to the global gain factor compensation circuit 305, and may perform NUC on pixel values received from the global gain factor compensation circuit 305 to compensate for non-uniform responses among individual IR detectors of the IR image detector circuit 110 to incident IR radiation. The NUC may be performed on the pixel values based on correction terms associated with the imaging data and/or current state of the imaging device, including the current and/or change to the integration time of infrared sensors. In some cases, the NUC circuit 310 may perform offset compensation calculations (e.g., by blocking a field of view with a shutter of uniform temperature) or more generally perform various aspects of non-uniformity compensation processes as would be understood by one skilled in the art. As previously described, gain associated with the integration time changes has been counteracted at the global gain factor compensation circuit 305 through use of the global gain factor $k*T_1/T_2$ and the resulting compensated image data is provided to the NUC circuit 310.

The spatial filter 315 may receive pixel values output from the NUC circuit 310 and perform spatial filtering on the pixel values in the spatial domain based on spatial filter parameters (e.g., filter coefficients). The temporal filter 320 may receive pixel values output from the spatial filter 315 and perform temporal filtering on the pixel values in the temporal domain based on temporal filter parameters and information associated with a previous IR image(s) (e.g., a previous IR image(s) generated using the processing pipeline). In some cases, the temporal filtering may occur prior to the spatial filtering. In some cases, the spatial filtering and the temporal filtering may occur together (e.g., filtering may occur in the space and time domains together), rather than as two discrete, sequential filtering operations. The filtering may be utilized to reduce noise associated with a pixel value of a pixel for an IR image based on a pixel value(s) of a neighboring pixel(s) in the same IR image (e.g., spatial filtering) and/or a pixel value(s) of a pixel(s) of a previous IR image(s) (e.g., temporal filtering).

The radiometric conversion circuit 325 may receive pixel values output from the temporal filter 320. The radiometric conversion circuit 325 may convert the received pixel values to pixel value outputs associated with the imaging data and/or integration time used to capture imaging data from an IR scene. For example, the radiometric conversion circuit 325 may perform scaling or other processing on the received pixel values to generate the radiometric image in accordance with radiometry terms of the imaging device and factors for thermal imaging capture (e.g., the integration time and/or integration time change). In an aspect, radiometric conversion may be utilized to process (e.g., transform) pixel values to be proportional to scene temperature.

In some cases, prior to radiometric conversion, pixel values are proportional to incident irradiance. For example, the radiometric conversion may include a conversion (e.g., non-linear conversion) based on Planck's equation (or inverse thereof), which describes the conversion between scene temperature and irradiance. In some cases, such an equation may have no closed-form solution. An approximation may be provided in a form of Signal_Out=B/ln[R/(Signal_In−O)+F], where R, F, B, and O are radiometric terms. R, F, B, and O have constant values, and are generally calibrated by curve-fitting pixel output for a number of known input scene temperatures. The various terms, parameters, previous IR image(s), constant k and/or global gain factor, etc. may be stored in local buffers of the components themselves (e.g., memory of the NUC circuit 310), the memory 130, and/or other memory communicatively coupled to or otherwise accessible to the IR imaging device 100.

Figure 4:
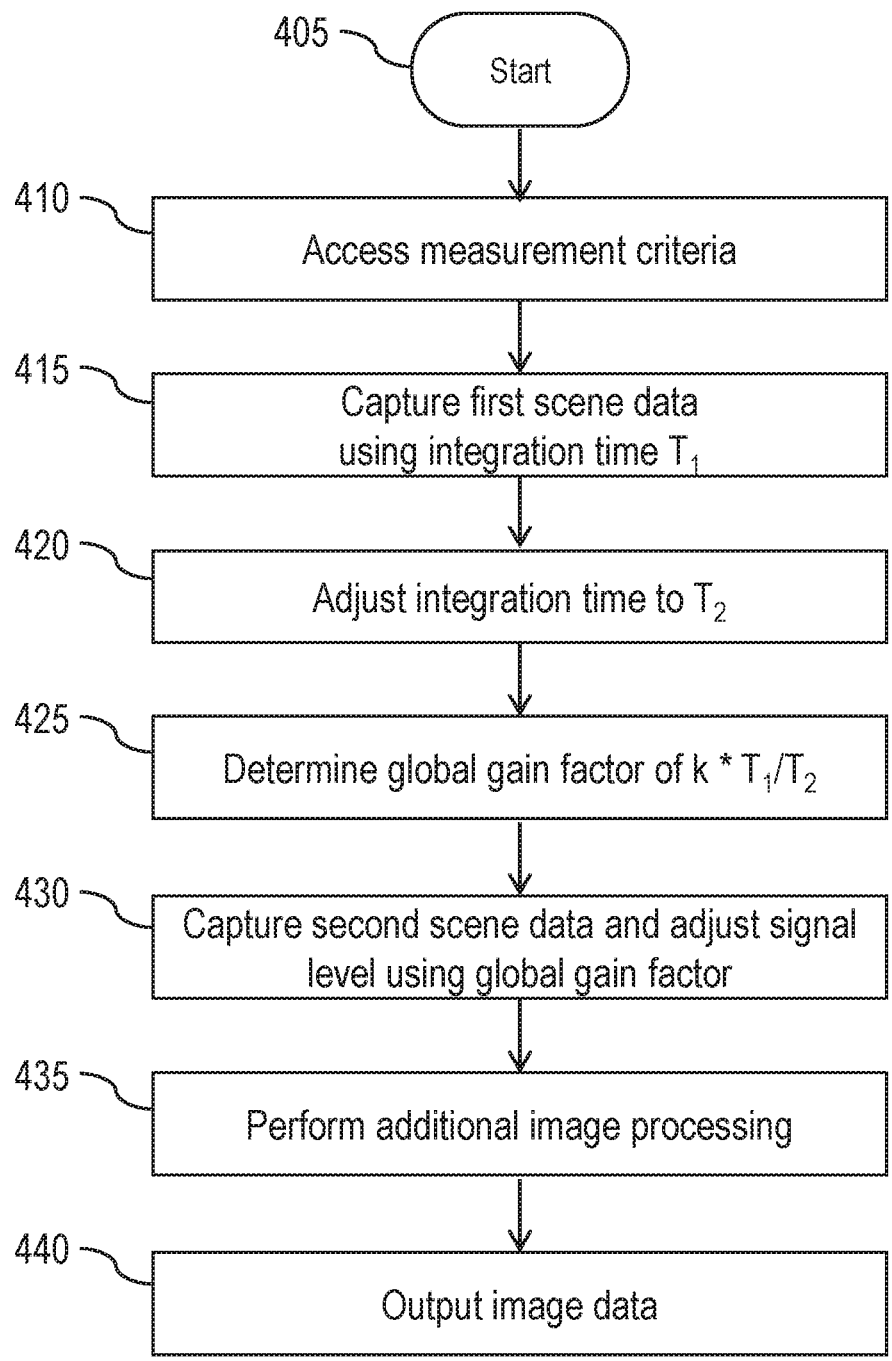
FIG. 4 illustrates a flowchart for facilitating image output adjustment responsive to integration time changes, according to an embodiment.

FIG. 4 illustrates a flowchart for dynamic adjustment of integration time based on scene temperature, according to an embodiment.

The process starts from a block 405, where an IR imaging system may be utilized to capture thermal data of a scene.

At block 410, measurement criteria that controls subsequent processes such as timing of these processes, scene characteristics, and/or other criteria are accessed and retrieved, which may include those criteria necessary to dynamically adjust an integration time and capture images using different integration times. The measurement criteria therefore may include one or more rules, factors, or temperatures that cause adjustment of an integration time, and may further include the necessary terms to adjust thermal data output in a visual form (e.g., image or video) to present consistent visual data of an IR scene without disturbances caused by changes in the integration time. For example, the measurement criteria may include a constant k as well as other necessary information to determine a global gain factor of $k*T_1/T_2$ and an initial integration time $T_1$ that is adjusted to $T_2$.

A scene is captured and first IR data is measured in the subsequent block 415. Capture of the first scene data may occur with infrared sensors of a focal plane array for an IR imaging device at a first integration time $T_1$. Thus, the infrared sensors may be configured to detect and collect infrared radiation using a first integration time $T_1$, and output the collected IR data to a processor for image processing based on $T_1$. The scene may be output as visual data, such as an image or series of images in a video. The scene may also have various thermal qualities, including temperature, temperature variations, or other qualities that may require use of a different integration time. For example, temperature range, irradiance, etc., of a scene and/or objects in a scene may cause automatic or manual adjustment of the IR imaging device to a different integration time.

At block 420, the integration time is adjusted, for example, based on the thermal qualities or characteristics of the scene. A new integration time $T_2$ may be provided. Adjustment of the initial integration time $T_1$ to the new integration time $T_2$ may occur for various factors and requirement of thermal image capture from an IR scene, including required temperature range, minimum or maximum temperature, clarity and/or resolution, or other factor that may be adjusted by the infrared imaging system automatically or manually during thermal imaging. Thus, integration time may be adjusted to a new integration time of $T_2$. At $T_2$, the time for an infrared sensor to capture or collect incoming infrared radiation may be increased or decreased depending on the requirements for output of infrared images. Once adjusted to $T_2$, a global gain factor may be determined at block 425. The global gain factor may be determined based on a constant k and the inverse of the change in signal level due to the change in integration times ($T_2/T_1$), which is $T_1/T_2$. Thus, the global gain factor corresponds to $k*T_1/T_2$. The constant k may correspond to a scale factor which compensates for a non-direct relation between integration time and image dynamics. This global gain factor may then be applied to prevent flickering or other image disturbances caused by the change in integration times.

Second scene data is captured by the IR imaging device, at block 430, and the signal level of data in the second scene data is adjusted by the global gain level. For example, the signal level of the data may be multiplied or otherwise adjusted by the global gain level. This compensates for the ratio of change in signal level of $T_2/T_1$ and properly provides consistent signal level data. Thus, the change in integration times does not cause image disturbances or flickering. At block 435, additional image processing may be performed, including NUC, spatial and/or temperature filtering, radiometric conversion, and/or other processing, of image data that may allow for proper image output. In some cases, block 435 may be optional. Once image processing is performed, image data is output at block 440. The output image data may be provided for display to a user (e.g., via display 135) and/or provided for storage (e.g., in the memory 130).

The foregoing describes a case in which the global gain factor is determined based on a change between two integration times. For a series of compensations, each new scale factor may be multiplied with a previous scale factor to achieve a next global gain value in the series of compensations. In some cases, if the integration time is stable over a longer period of time, the global gain may gradually and slowly (e.g., to hide the changes from the viewer) be adjusted to unity (i.e., 1) to ensure use of available computational dynamics (e.g., not floating point operations in video processing).

In addition, although the foregoing describes the use of the factor k as a global gain, the factor k may instead be utilized as a per-pixel compensation in some embodiments. As an example, consider a pixel array formed of N rows and M columns of pixels (e.g., microbolometers). Each pixel may have an associated scale factor $k(i,j)$, where $(i,j)$ identifies a pixel at an $i^{th}$ row and $j^{th}$ column of the pixel array with $i=1$, N and $j=1, 2, \ldots, M$. The scale factor $k(i,j)$ for each pixel may be based on a signal level associated with the pixel and the integration times $T_1$ and $T_2$. As such, in scaling an infrared image captured by the pixel array, each pixel of the infrared image (e.g., captured by a respective pixel/detector of the pixel array) may be scaled using a respective scale factor $k(i,j)$ associated with the pixel. In an embodiment, the same integration time is used for all the pixels of the pixel array. For example, all the pixels may use the integration time $T_1$ and then all the pixels may be transitioned to the integration time $T_2$.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method, comprising:
    capturing, by an infrared imaging device, a first image of a scene using a first integration time;
    determining a second integration time based at least on characteristics of the scene in the first image, wherein the second integration time is different from the first integration time;
    determining a first scale factor based on the first integration time and the second integration time;
    capturing, by the infrared imaging device, a second image using the second integration time, wherein the first image and the second image are infrared images; and
    scaling the second image using at least the first scale factor.

2. The method of claim 1, wherein the first scale factor is based on T1/T2, and wherein T1 is the first integration time and T2 is the second integration time.

3. The method of claim 1, wherein the first scale factor is further based on a factor k established to compensate for changes in integration times of the infrared imaging device; and
    wherein the capturing the first image comprises:
        determining, by the infrared imaging device, the first image based on first signal data at a first set of signal levels,
    wherein the capturing the second image comprises:
        determining, by the infrared imaging device, the second image based on second signal data at a second set of signal levels.

4. The method of claim 3, wherein the second set of signal levels is increased or decreased over the first set of signal levels by a factor T2/T1 in response to a change from the first integration time to the second integration time, wherein T1 is the first integration time and T2 is the second integration time, and wherein the first scale factor is based on the factor k multiplied by T1/T2.

5. The method of claim 4, wherein the scaling the second image comprises adjusting the second set of signal levels of the second image using the first scale factor to obtain the scaled second image.

6. The method of claim 1, further comprising:
    processing the scaled second image to generate a processed image;
    providing for display the processed image on a display device;
    determining a third integration time based at least on characteristics of the second image;
    capturing a third image using the third integration time;
    determining a second scale factor based at least on the first scale factor and the third integration time; and
    applying the second scale factor to the third image to generate a scaled third image.

7. The method of claim 6, further comprising:
    processing the scaled third image to generate a second processed image; and
    providing for display the second processed image on the display device,
    wherein the second scale factor is based on T2/T3 and the first scale factor, wherein T2 is the second integration time and T3 is the third integration time, and wherein the first image and second image are thermal images.

8. The method of claim 1, wherein the infrared imaging device comprises a focal plane array comprising a plurality of infrared sensors, and wherein the first image and the scaled second image are consecutive images of a real time video stream.

9. The method of claim 1, further comprising determining one or more additional scale factors based on the first integration time and the second integration time, wherein the scaling the second image comprises scaling the second image using the first scale factor and the one or more additional scale factors.

10. The method of claim 9, wherein the first scale factor and the one or more additional scale factors are each associated with a respective portion of the second image, wherein the first scale factor and the one or more additional scale factors are each based on a respective signal level associated with its respective portion, and wherein each respective portion of the second image is a respective pixel of the second image.

11. The method of claim 1, wherein the characteristics comprise a temperature associated with the scene and/or an object in the scene.

12. A system, comprising:
    an infrared imaging device configured to capture a first image of a scene using a first integration time and a second image using a second integration time different from the first integration time, wherein the first image and the second image are infrared images; and
    a processing circuit configured to:
        determine the second integration time based at least on content of the first image;
        determine a first scale factor for the second integration time based on the first integration time and the second integration time; and
        scale the second image using at least the first scale factor.

13. The system of claim 12, wherein the first scale factor is based on T1/T2, and wherein T1 is the first integration time and T2 is the second integration time.

14. The system of claim 12, wherein the first scale factor is further based on a factor k established to compensate for changes in integration times of the infrared imaging device, and wherein the factor k is based on the second integration time.

15. The system of claim 12, wherein:
    the processing circuit is further configured to determine one or more additional scale factors based on the first integration time and the second integration time; and
    the processing circuit is configured to scale the second image using the first scale factor and the one or more additional scale factors.

16. The system of claim 15, wherein the first scale factor and the one or more additional scale factors are each associated with a respective portion of the second image.

17. The system of claim 16, wherein the first scale factor and the one or more additional scale factors are each based on a respective signal level associated with its respective portion.

18. A system, comprising:
    an imaging device configured to capture a first image of a scene using a first integration time and a second image using a second integration time different from the first integration time; and a processing circuit configured to:
   determine the second integration time based at least on content of the first image;
   determine a first scale factor for the second integration time based on the first integration time and the second integration time;
   scale the second image using at least the first scale factor;
   process the scaled second image to generate a processed image; and
   provide for display the processed image on a display device.

19. The system of claim 18, wherein:
the processing circuit is further configured to determine a third integration time based at least on characteristics of the second image;
the imaging device is further configured to capture a third image using a third integration time;
the processing circuit is further configured to:
   determine a second scale factor based at least on the third integration time and the first scale factor; and
   apply the second scale factor to the third image to generate a scaled third image;
   process the scaled third image to generate a second processed image; and
   provide for display the second processed image on the display device.

\* \* \* \* \*